US012482645B2

(12) United States Patent
Nishiguchi

(10) Patent No.: US 12,482,645 B2
(45) Date of Patent: Nov. 25, 2025

(54) MASS SPECTROMETER

(71) Applicant: SHIMADZU CORPORATION, Kyoto (JP)

(72) Inventor: Masaru Nishiguchi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 484 days.

(21) Appl. No.: 17/973,919

(22) Filed: Oct. 26, 2022

(65) Prior Publication Data

US 2023/0215719 A1 Jul. 6, 2023

(30) Foreign Application Priority Data

Jan. 5, 2022 (JP) ................................. 2022-000502

(51) Int. Cl.
*H01J 49/42* (2006.01)
*H01J 49/24* (2006.01)

(52) U.S. Cl.
CPC ............ *H01J 49/426* (2013.01); *H01J 49/24* (2013.01); *H01J 49/4215* (2013.01)

(58) Field of Classification Search
CPC ...... H01J 49/426; H01J 49/24; H01J 49/4215; H01J 49/044; H01J 49/063; H01J 49/067; G01N 27/62
See application file for complete search history.

(56) References Cited

U.S. PATENT DOCUMENTS 5,672,868 A * 9/1997 Mordehai ........... H01J 49/0445 250/281
11,355,335 B2 * 6/2022 Park .................... H01J 49/0031
2009/0218486 A1 9/2009 Whitehouse et al.
2011/0127416 A1 * 6/2011 Campuzano .......... H01J 49/067 250/288

(Continued)

FOREIGN PATENT DOCUMENTS

DE 112004000929 B4 * 9/2010 ............ H01J 49/161
JP 2014-112570 A 6/2014

(Continued)

OTHER PUBLICATIONS

Japanese Office Action dated May 27, 2025 in Application No. 2022-000502.

*Primary Examiner* — Robert H Kim
*Assistant Examiner* — Christopher J Gassen
(74) *Attorney, Agent, or Firm* — Sughrue Mion, PLLC

(57) ABSTRACT

The present mass spectrometer has one or more intermediate vacuum chambers between an ion source to generate ions derived from a sample component in an atmospheric pressure atmosphere and a vacuum chamber where a mass separator is arranged, including an ion transport unit to have an ion outlet in a first intermediate vacuum chamber at a subsequent stage of the ion source and send ions to the first chamber, an exhaust opening portion to evacuate the first chamber, which is provided in front of ion flow discharged from the ion outlet into the first chamber, an ion delivery (Continued)

opening portion to send ions to a next stage, which is provided on a line intersecting a straight line connecting the ion outlet and the exhaust opening portion, and an ion guide to guide ions to the ion delivery opening portion by an action of a radio-frequency electric field.

5 Claims, 4 Drawing Sheets

(56) References Cited

U.S. PATENT DOCUMENTS

| | | | | |
|---|---|---|---|---|
| 2012/0228492 | A1* | 9/2012 | Franzen | H01J 49/401 250/288 |
| 2013/0284918 | A1 | 10/2013 | Okumra | |
| 2019/0157065 | A1* | 5/2019 | Stewart | H01J 49/0072 |
| 2020/0381240 | A1 | 12/2020 | Park | |
| 2021/0391164 | A1 | 12/2021 | Ueda et al. | |
| 2022/0293408 | A1 | 9/2022 | Nishiguchi | |

FOREIGN PATENT DOCUMENTS

| | | | | |
|---|---|---|---|---|
| WO | WO-2012046430 | A1 * | 4/2012 | H01J 49/063 |
| WO | 2012/081122 | A1 | 6/2012 | |
| WO | 2020/110264 | A1 | 6/2020 | |
| WO | WO-2020129199 | A1 * | 6/2020 | H01J 49/063 |
| WO | WO-2021191759 | A1 * | 9/2021 | H01J 49/068 |

* cited by examiner

MASS SPECTROMETER

TECHNICAL FIELD

The present invention relates to a mass spectrometer, and more particularly to a mass spectrometer having an atmospheric pressure ion source.

BACKGROUND ART

In a mass spectrometer using an atmospheric pressure ion source such as an electrospray ion source, generally, a configuration of a multistage differential exhaust system in which two or more intermediate vacuum chambers are arranged between an ionization chamber having substantially atmospheric pressure in which an atmospheric pressure ion source is arranged and an analysis chamber having a high vacuum in which a mass separator and an ion detector are arranged is employed. In such a mass spectrometer, an ion guide, which is a kind of ion optical element, is used to efficiently collect ions in each intermediate vacuum chamber and send the ions to a next stage.

In a low-vacuum intermediate vacuum chamber having gas pressure of about 100 Pa and a medium-vacuum intermediate vacuum chamber having gas pressure of about 1 Pa, RF ion guides of a multipole type, such as a quadrupole type and an octupole type, which capture and transport ions by an action of a radio-frequency electric field (RF electric field), are widely used.

For example, in a mass spectrometer described in Patent Literature 1, an ion introduction port as an outlet of a desolvation tube through which ions are introduced from an ionization chamber is arranged in a low-vacuum first intermediate vacuum chamber on a wall separating it from the ionization chamber, and an ion passage hole (orifice in a skimmer top portion) for sending ions from the first intermediate vacuum chamber to a second intermediate vacuum chamber at a next stage is provided on a wall facing the previously described wall at a position coaxial with the ion introduction port. In the first intermediate vacuum chamber, an RF ion guide is provided which converges the ions emitted from the ion introduction port and lets those ions pass through the ion passage hole.

In the mass spectrometer having such a configuration, ions introduced into the first intermediate vacuum chamber can be sent to a next stage with low loss, but neutral particles such as non-ionized molecules introduced into the first intermediate vacuum chamber together with the ions easily enter the second intermediate vacuum chamber. Such neutral particles cause contamination of wall surfaces of the second intermediate vacuum chamber and a subsequent analysis chamber and an ion optical element arranged in the chamber.

CITATION LIST

Patent Literature

Patent Literature 1: WO 2020/110264 A
Patent Literature 2: WO 2012/081122 A
Patent Literature 3: WO 2020/129199 A

SUMMARY OF INVENTION

Technical Problem

In recent years, for the purpose of preventing neutral particles from entering from a first intermediate vacuum chamber to a subsequent stage of an intermediate vacuum chamber or an analysis chamber, an off-axis type ion transport optical system in which an ion introduction port and an ion passage hole are not provided on a straight line as positions of the ion introduction port and the ion passage hole are shifted, is used. However, even in a case where such a configuration is employed, it is difficult to completely prevent neutral particles from entering a vacuum chamber at a subsequent stage.

Further, in a conventional mass spectrometer, a larger part of neutral particles introduced into a first intermediate vacuum chamber together with ions move around in the first intermediate vacuum chamber and are expelled from an exhaust port to the outside of the chamber. For this reason, there is also a problem that, if there are many neutral particles entering the first intermediate vacuum chamber, contamination of a wall surface of the intermediate vacuum chamber and an ion optical element arranged in the vacuum chamber easily occurs.

When inner walls of the intermediate vacuum chamber and the analysis chamber and the ion optical element arranged in these chambers are contaminated, the state of the electric field for controlling the movement of ions changes, which may cause a decrease in performance such as a decrease in sensitivity. Further, since the frequency of apparatus maintenance such as cleaning contaminated members should increase, there are problems that cost increases, and furthermore, downtime of the apparatus increases and operation efficiency of the apparatus decreases.

The present invention has been made in view of such problems, and a main object of the present invention is to provide a mass spectrometer capable of reducing contamination of an inner wall of a vacuum chamber, an ion optical element arranged in the vacuum chamber, and the like mainly caused by neutral particles.

Solution to Problem

One mode of a mass spectrometer according to the present invention made to solve the above problem is a mass spectrometer having one or more intermediate vacuum chambers between an ion source configured to generate ions derived from a sample component in an atmospheric pressure atmosphere and a vacuum chamber in which a mass separator configured to mass-separate ions is arranged, the mass spectrometer including: an ion transport unit configured to have an ion outlet in a first intermediate vacuum chamber at a subsequent stage of the ion source and send ions from the ion source to the first intermediate vacuum chamber;

- an exhaust opening portion configured to evacuate the first intermediate vacuum chamber, the exhaust opening portion being provided at a position in front of ion flow discharged from the ion outlet into the first intermediate vacuum chamber;
- an ion delivery opening portion configured to send ions from the first intermediate vacuum chamber to a next stage, the ion delivery opening portion being provided at a position on a line intersecting a straight line connecting the ion outlet and the exhaust opening portion; and
- an ion guide configured to guide ions emitted from the ion outlet to the ion delivery opening portion by an action of a radio-frequency electric field.

Advantageous Effects of Invention

According to the above mode of the mass spectrometer according to the present invention, it is possible to efficiently transport ions introduced into the first intermediate vacuum chamber to a next stage, and, at the same time, to reduce intrusion of neutral particles such as sample component molecules introduced into the first intermediate vacuum chamber together with the ions into a vacuum chambers of a next and subsequent stages. Further, the neutral particles sent together with the ions from the ion source into the first intermediate vacuum chamber can be separated from the ions and quickly evacuated. In this manner, it is possible to reduce contamination due to attachment of neutral particles to inner walls of the first intermediate vacuum chamber and subsequent vacuum chambers, an ion optical element arranged in the vacuum chambers, and the like. As a result, it is possible to avoid a decrease in performance of the device such as a decrease in sensitivity, reduce the frequency of maintenance of the apparatus, and reduce running cost and downtime of the apparatus.

DESCRIPTION OF EMBODIMENTS

Hereinafter, a mass spectrometer of an embodiment of the present invention will be described below with reference to the accompanying drawings.

Figure 1:
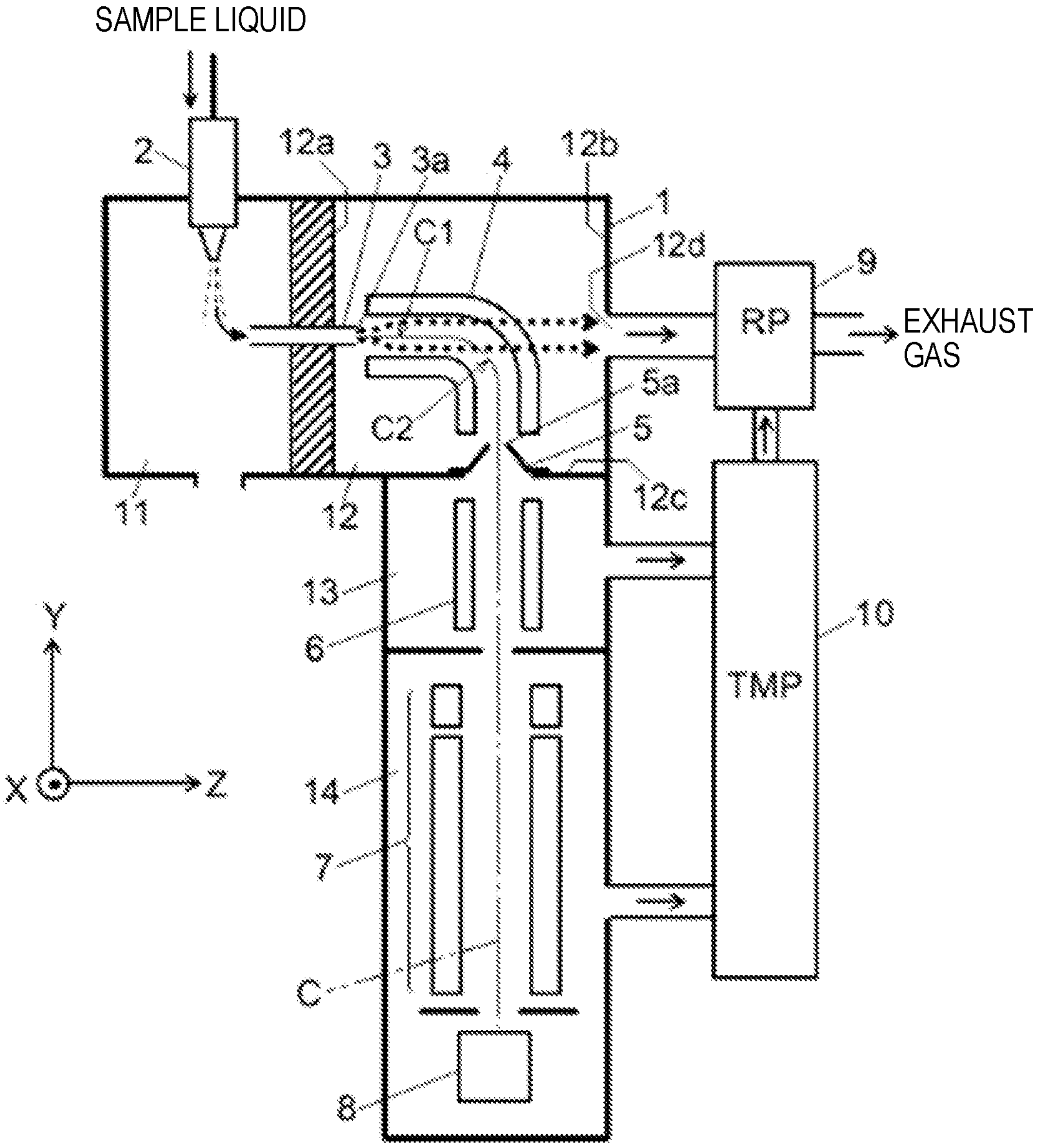
FIG. 1 is a schematic configuration diagram of a mass spectrometer according to an embodiment of the present invention.
Figure 2:
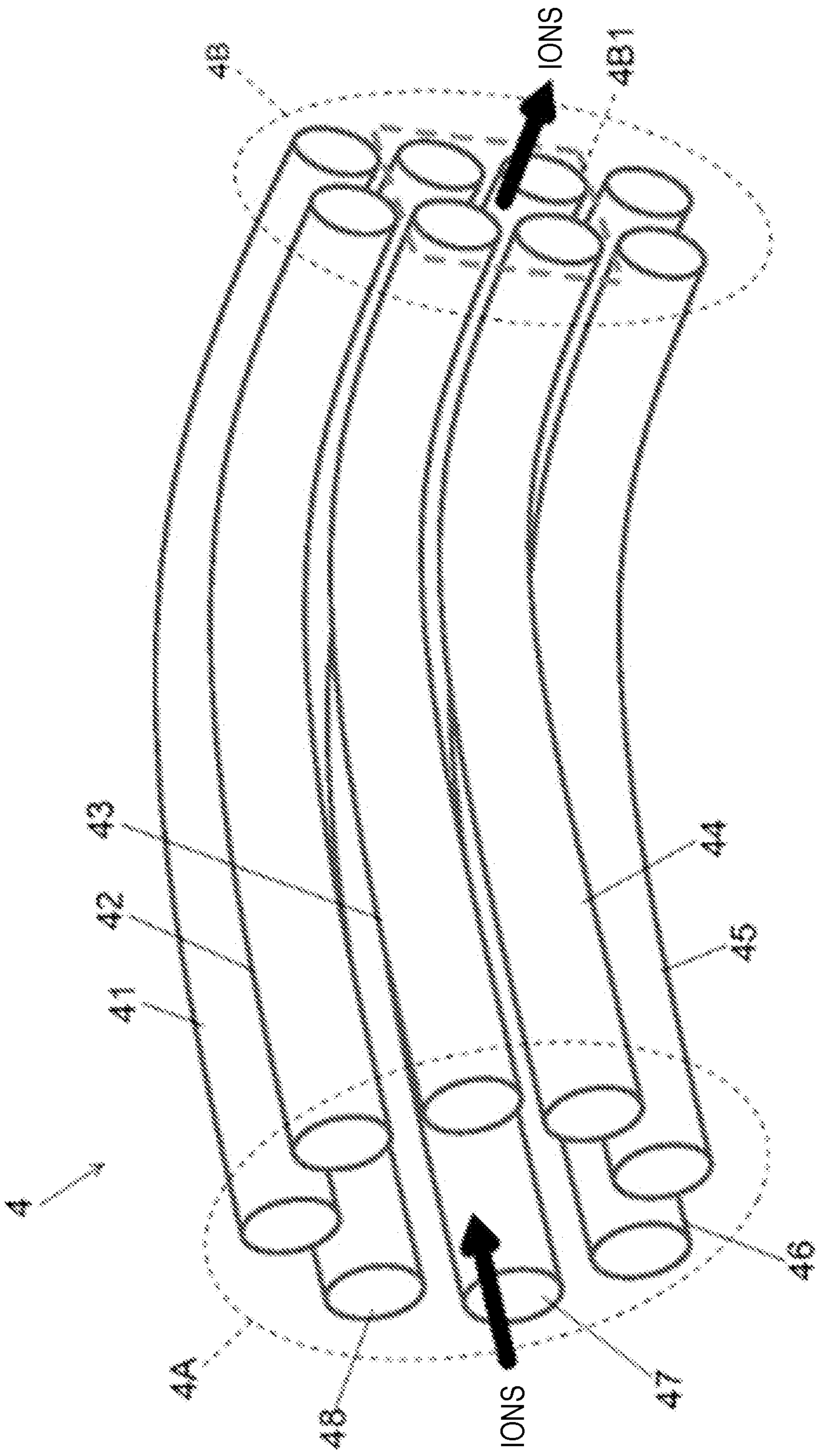
FIG. 2 is a schematic perspective view of an ion guide in the mass spectrometer of the present embodiment.
Figure 3:
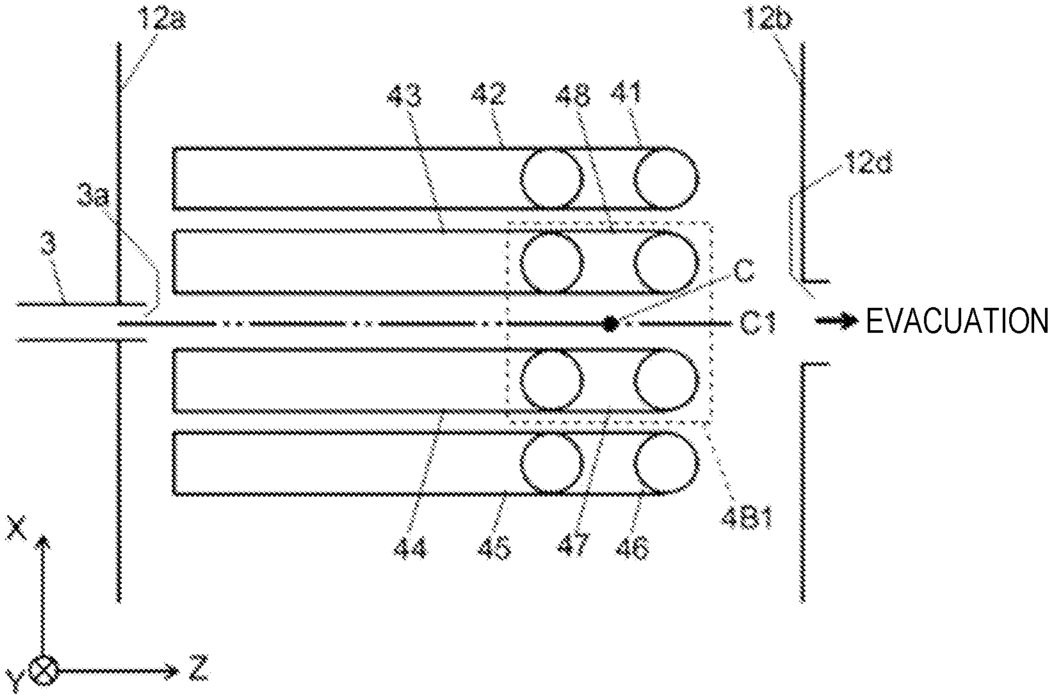
FIG. 3 is a schematic diagram of the inside of a first intermediate vacuum chamber as viewed in a Y-axis direction in the mass spectrometer of the present embodiment.

FIG. 1 is a schematic configuration diagram of the mass spectrometer of the present embodiment. FIG. 2 is a schematic perspective view of an ion guide in the mass spectrometer of the present embodiment. FIG. 3 is a schematic diagram of the inside of a first intermediate vacuum chamber as viewed in a Y-axis direction in the mass spectrometer of the present embodiment.

The mass spectrometer of the present embodiment is a single-type quadrupole mass spectrometer including an atmospheric pressure ion source. For convenience of description, three axes of X, Y, and Z orthogonal to each other are defined in a space as illustrated in FIG. 1.

In this mass spectrometer, four chambers of an ionization chamber 11, a first intermediate vacuum chamber 12, a second intermediate vacuum chamber 13, and an analysis chamber 14 are provided inside a chamber 1. The inside of the ionization chamber 11 is at substantially atmospheric pressure, and the inside of the first intermediate vacuum chamber 12 is evacuated by a rotary pump (RP) 9. Further, the second intermediate vacuum chamber 13 and the analysis chamber 14 are evacuated by a turbo molecular pump (TMP) 10 and a rotary pump 9 as a roughing vacuum pump. This mass spectrometer has a configuration of a multistage differential exhaust system in which degree of vacuum sequentially increases from the ionization chamber 11 to the first intermediate vacuum chamber 12, the second intermediate vacuum chamber 13, and the analysis chamber 14. As an example, gas pressure of the first intermediate vacuum chamber 12 is about 100 Pa, gas pressure of the second intermediate vacuum chamber 13 is about 1 Pa, and gas pressure of the analysis chamber 14 is about $10^{-2}$ to $10^{-4}$ Pa.

The ionization chamber 11 is provided with an electrospray ionization (ESI) probe 2 as an ion source. The ionization chamber 11 and the first intermediate vacuum chamber 12 communicate with each other through a desolvation tube 3 having a small diameter. In this example, a central axis of the ESI probe 2 is parallel to a Y axis, a central axis of an ion inlet of the desolvation tube 3 is parallel to a Z axis, and both the central axes are orthogonal to each other, but this is an example and can be changed as appropriate.

The first intermediate vacuum chamber 12 has a substantially rectangular parallelepiped shape, and an ion outlet **3*a* of the desolvation tube 3 is located on a first wall surface 12*a* among a plurality of wall surfaces defining the first intermediate vacuum chamber 12. Among a plurality of wall surfaces defining the first intermediate vacuum chamber 12, an exhaust opening 12*d* connected to the rotary pump 9 is provided at a position on the second wall surface 12*b* facing the first wall surface 12*a* and substantially on an extended line of a central axis C1 of the ion outlet 3*a*. A skimmer 5 is provided on the third wall surface 12*c* that is neither the first wall surface 12*a* nor the second wall surface 12*b*. The skimmer 5 has an ion passage hole 5*a* formed in a top portion to send ions to a next stage. In this example, the first wall surface 12*a* and the second wall surface 12*b* are surfaces parallel to an X-Y plane, and the third wall surface 12*c*** is a surface parallel to an X-Z plane.

In the first intermediate vacuum chamber 12, an RF ion guide 4 of a multipole type for guiding ions introduced from the ion outlet **3*a* to the ion passage hole 5*a* by bending a track of the ions by approximately 90° as indicated by a reference numeral C2 in FIG. 1 is arranged. As illustrated in FIG. 2, the RF ion guide 4 includes eight curved rod electrodes 41 to 48**. An ion guide itself including a curved rod electrode is conventionally known as described in, for example, Patent Literature 2 or the like. However, in this example, instead of a simple RF ion guide, an RF ion guide of a pole number conversion type having an octupole structure on the ion inlet side and a substantially quadrupole structure on the ion outlet side is used. This point will be described in detail later.

As illustrated in FIG. 1, the center axis C1 of the desolvation tube 3 extends substantially parallel to the Z axis, but an ion optical axis C in the second intermediate vacuum chamber 13 and the analysis chamber 14 extends substantially parallel to the Y axis. An RF ion guide 6 of a multipole type is arranged in the second intermediate vacuum chamber 13. Unlike the RF ion guide 4, the RF ion guide 6 includes a plurality of linear rod electrodes. In the analysis chamber 14, a quadrupole mass filter 7 and an ion detector 8 are arranged along the ion optical axis C. In this example, the quadrupole mass filter 7 includes a main rod electrode and a pre-rod electrode arranged at a previous stage of the main rod electrode, but the pre-rod electrode can be omitted.

Here, an RF ion guide of a pole number conversion type used as the RF ion guide 4 will be described.

An example of the pole number conversion type RF ion guide is described in Patent Literature 3. In a general RF ion guide, a plurality of (even number of) linear rod electrodes are arranged parallel to an ion optical axis around a linear ion optical axis. Then, by applying RF voltages having opposite polarities, that is, phases shifted by 180° to two rod electrodes adjacent to each other around the ion optical axis, a multipole RF electric field is formed in a space surrounded by the rod electrodes. For example, in a case of an octupole ion guide, an octupole RF electric field is formed at the inlet of the ion guide, and an octupole RF electric field is similarly formed at the outlet of the ion guide. That is, the number of poles is unchanged over the entire region from the inlet to the outlet of the ion guide.

In contrast, in one pole number conversion type RF ion guide described in Patent Literature 3, some of a plurality of linear rod electrodes arranged around a linear ion optical axis are arranged so as to be inclined with respect to an ion optical axis. In this manner, an octupole RF electric field can be formed at an inlet of the ion guide, and a quadrupole RF electric field can be substantially formed at an outlet of the ion guide. That is, the number of poles changes between the inlet and the outlet of the ion guide.

A multipole RF electric field such as a hexapole or an octupole RF electric field has a stronger ion confinement action and better ion acceptance than a quadrupole RF electric field. For this reason, in order to favorably capture ions arriving from the front and in a state of being spread to some extent and take the ions into an internal space, a multipole RF electric field of a hexapole or more RF electric field is preferable than a quadrupole RF electric field. On the other hand, although a quadrupole RF electric field has a weaker ion confinement action than a multipole RF electric field of a hexapole or more RF electric field, the quadrupole RF electric field has a strong action of converging ions to the vicinity of a central axis. For this reason, in order to converge transported ions in a space surrounded by a plurality of rod electrodes to the vicinity of the central axis and allow the ions to pass through a small opening with low loss, a quadrupole RF electric field is more preferable than a multipole RF electric field of a hexapole or more RF electric field. An ion guide of a pole number conversion type has an advantage that an RF electric field suitable for efficiently transporting ions can be formed in each region by changing the number of poles between an inlet and an outlet of ions as described above.

In the RF ion guide 4 employed in the mass spectrometer of the present embodiment, at least a part of eight of the curved rod electrodes 41 to 48 arranged around an ion optical axis curved in a substantially arc shape is arranged such that a separation distance from the ion optical axis changes along the ion optical axis. In this manner, as illustrated in FIG. 2, at an ion inlet 4A, eight of the curved rod electrodes 41 to 48 are arranged at an equal distance from a central axis (ion optical axis), and at an ion outlet 4B, only four of the curved rod electrodes 43, 44, 47, and 48 located inside a square 4B1 are arranged at an equal distance from the central axis (ion optical axis). Of eight of the curved rod electrodes 41 to 48, RF voltages of opposite polarities are applied to two curved rod electrodes adjacent in the circumferential direction at the ion inlet 4A. In this manner, also in the RF ion guide 4, an octupole RF electric field can be formed at the ion inlet 4A, and a quadrupole RF electric field can be formed at the ion outlet 4B. In this manner, as described above, it is possible to utilize both a strong ion confinement action by the octupole RF electric field and a strong ion convergence action by the quadrupole RF electric field.

Further, eight of the curved rod electrodes 41 to 48 are arranged substantially as shown in FIG. 3 when viewed in the Y-axis direction. That is, the curved rod electrodes 41 to 48 do not exist on a plane including an extended line of the central axis C1 of the ion outlet 3*a* of the desolvation tube 3 and the curved ion optical axis C2 in the RF ion guide 4. This is to prevent the curved rod electrodes 41 to 48 from being arranged so as to block flow of gas containing neutral particles discharged together with ions from the ion outlet 3*a* as described later.

Next, analysis operation in the mass spectrometer of the present embodiment will be described.

The ESI probe 2 nebulizes sample liquid into the ionization chamber 11 as fine charged droplets to ionize various components contained in the sample liquid. The generated ions are carried in gas flow formed mainly by a pressure difference between both end openings of the desolvation tube 3 and are sucked into the desolvation tube 3. At this time, together with ions derived from a sample component, minute charged droplets in which a solvent is not sufficiently vaporized, and neutral particles such as molecules that are not ionized (or molecules generated by recombination with electrons once ionized) are also sucked into the desolvation tube 3. The desolvation tube 3 is heated to a predetermined temperature, and when charged droplets in which a solvent is not sufficiently vaporized are sucked into the desolvation tube 3, vaporization of the solvent is promoted when the charged droplets pass through the desolvation tube 3, and ions are generated.

Ions and neutral particles sucked into the desolvation tube 3 are released together with gas from the ion outlet 3*a* into the first intermediate vacuum chamber 12. At this time, gas flow becomes a supersonic free jet, and ions tend to spread by barrel shock. However, as described above, since an RF electric field at the ion inlet 4A of the RF ion guide 4 is an octupole RF electric field having a strong ion confinement action, ions are efficiently (that is, with low loss) captured by the RF electric field and taken into an internal space of the RF ion guide 4. Then, the ions have their track bent along the RF ion guide 4 and reach the ion outlet 4B. Since a quadrupole RF electric field is formed at the ion outlet 4B, the ions are converged near the ion optical axis C and sent to the second intermediate vacuum chamber 13 via the ion passage hole 5*a*.

On the other hand, gas molecules and neutral particles discharged from the ion outlet 3*a* into the first intermediate vacuum chamber 12 are not affected by an electric field by the RF ion guide 4. For this reason, as indicated by a dotted arrow in FIG. 1, gas flow containing neutral particles travels substantially straight while spreading, and is separated from ion flow. Since the exhaust opening 12*d* is provided in front of the gas flow in the traveling direction, the neutral particles together with the gas are expelled to the outside of the chamber 1 through the exhaust opening 12*d*.

Figure 6:
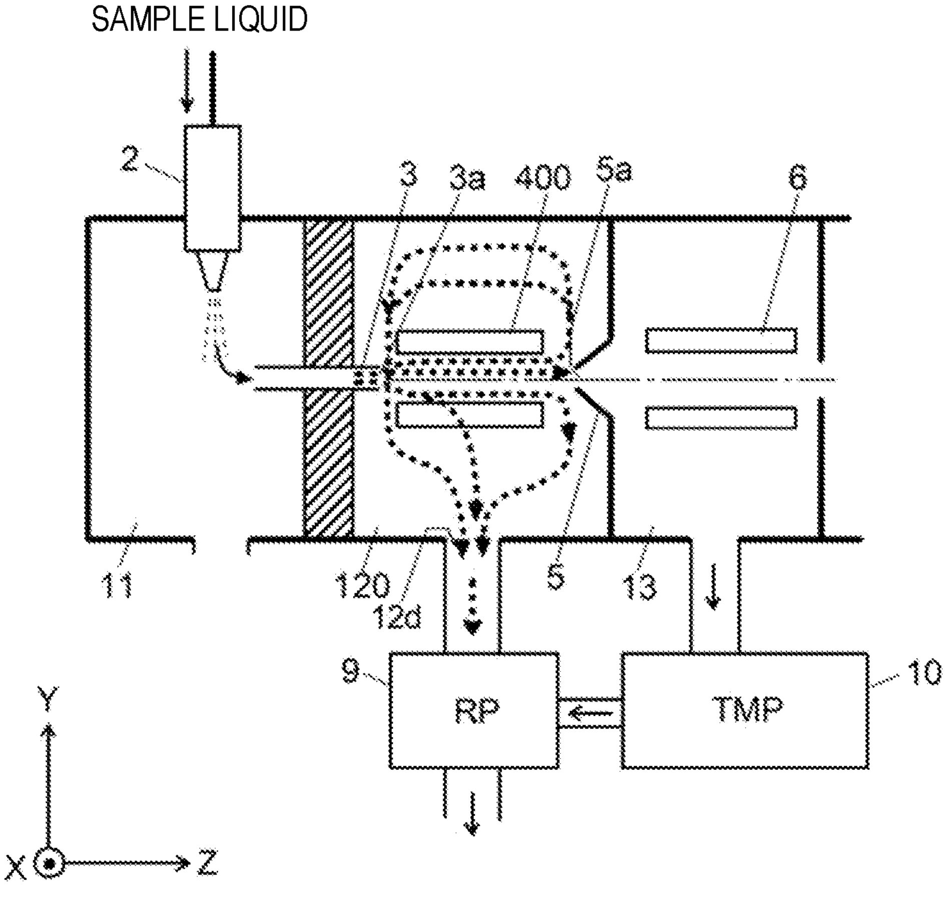
FIG. 6 is a configuration diagram of a main part around a first intermediate vacuum chamber in a conventional general mass spectrometer.

For comparison with the mass spectrometer of the present embodiment, FIG. 6 shows a configuration diagram of a main part around the first intermediate vacuum chamber 12 in a conventional general mass spectrometer. In FIG. 6, a constituent element corresponding to that in the configuration illustrated in FIG. 1 is denoted by the same reference numeral. As indicated by a dotted arrow in FIG. 6, in this configuration, gas flow containing neutral particles directly hits the skimmer 5 in which the ion passage hole 5*a* for sending ions to the second intermediate vacuum chamber 13 is formed, so that a part of the neutral particles easily enters the second intermediate vacuum chamber 13 through the ion passage hole 5*a*. Further, since a larger part of the other neutral particles move around in the first intermediate vacuum chamber 12 on the gas flow, an inner wall of the first intermediate vacuum chamber 12 and a member in the vacuum chamber 12 are likely to be contaminated.

On the other hand, in the mass spectrometer of the present embodiment, gas flow containing neutral particles is smoothly expelled in the first intermediate vacuum chamber 12. As gas flow from the ion outlet 3*a* to the exhaust opening 12*d* is smoother, neutral particles are less likely to spread into the first intermediate vacuum chamber 12. As illustrated in FIG. 3, since the curved rod electrodes 41 to 48 constituting the RF ion guide 4 are arranged so as not to obstruct the gas flow as much as possible, disturbance of the gas flow is reduced, and the neutral particles are smoothly expelled without moving around in the first intermediate vacuum chamber 12. Further, it is also possible to suppress contamination of the curved rod electrodes 41 to 48 themselves due to attachment of neutral particles. Since neutral particles are less likely to move around in the first intermediate vacuum chamber 12, contamination of not only the RF ion guide 4 but also other members installed in the first intermediate vacuum chamber 12 and an inner wall of the first intermediate vacuum chamber 12 can be reduced.

Among a plurality of rod electrodes constituting the RF ion guide 6 in the second intermediate vacuum chamber 13, rod electrodes adjacent around the ion optical axis C are applied with RF voltages having opposite polarities from a power supply unit (not illustrated). In this manner, a multipole RF electric field is formed in an internal space of the RF ion guide 6. Ions sent to the second intermediate vacuum chamber 13 through the ion passage hole 5*a* are captured by the multipole RF electric field of the RF ion guide 6, further converged, and sent to the analysis chamber 14.

A predetermined voltage is applied from a power supply unit (not illustrated) to a plurality of rod electrodes constituting the quadrupole mass filter 7 in the analysis chamber 14. Due to an action of an electric field formed by this, among ions introduced into the quadrupole mass filter 7, only ions having a specific m/z selectively pass through the quadrupole mass filter 7, and the other ions diverge on the way. The ion detector 8 detects ions that reach the ion detector 8 by passing through the quadrupole mass filter 7, and outputs a detection signal having an intensity corresponding to an amount of the ions.

This detection signal is input to a data processing unit (not illustrated), and data processing is performed in the data processing unit. For example, when voltage applied to the electrodes constituting the quadrupole mass filter 7 is scanned in a predetermined range, an m/z value of ions that may pass through the quadrupole mass filter 7 changes. In view of the above, the data processing unit can generate a mass spectrum indicating a change in ionic intensity over a predetermined m/z range by processing a detection signal corresponding to such scanning of the m/z value.

As described above, in the mass spectrometer of the present embodiment, neutral particles introduced into the first intermediate vacuum chamber 12 together with ions are less likely to enter the second intermediate vacuum chamber 13, and are likely to be quickly expelled to the outside of the chamber 1 without moving around even in the first intermediate vacuum chamber 12. It is thus possible to reduce contamination of an inner wall of the first intermediate vacuum chamber 12, members such as the RF ion guide 4 arranged in the first intermediate vacuum chamber 12, an inner wall of the second intermediate vacuum chamber 13, members such as the RF ion guide 6 arranged in the second intermediate vacuum chamber 13, an inner wall of the analysis chamber 14, and members such as the quadrupole mass filter 7 arranged in the analysis chamber 14. On the other hand, since ions derived from a sample component are efficiently transported from the first intermediate vacuum chamber 12 to the second intermediate vacuum chamber 13, high detection sensitivity can be realized.

[Variation]

Figure 4:
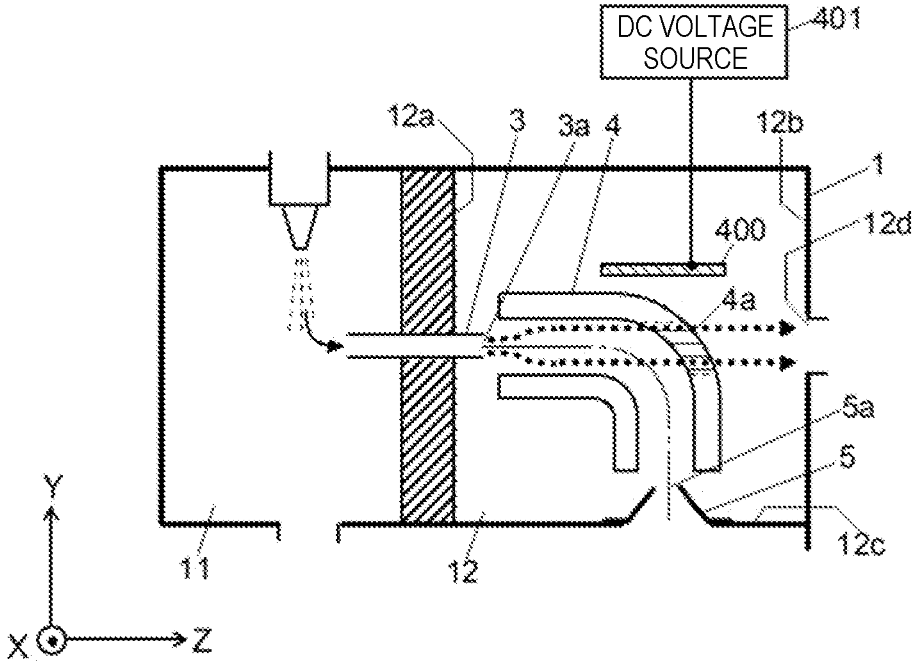
FIG. 4 is a partial configuration diagram of a variation of the mass spectrometer of the present embodiment.

In the mass spectrometer of the above embodiment, eight of the curved rod electrodes 41 to 48 constituting the RF ion guide 4 are arranged so as not to obstruct gas flow, but one or more of the curved rod electrodes 41 to 48 constituting the RF ion guide 4 may have a structure in which a portion that may cross gas flow from the ion outlet 3*a* toward the exhaust opening 12*d* is squeezed and recessed. In FIG. 4, a recessed portion formed by this squeezing is indicated by a reference sign 4*a*.

With such a structure, the gas flow is less likely to come into contact with the curved rod electrodes 41 to 48, but an RF electric field formed in a space surrounded by the curved rod electrodes 41 to 48 is disturbed, an action of bending a track of ions is weakened, and there is a possibility that the ions easily disperse. In view of the above, as a countermeasure, as illustrated in FIG. 4, the configuration may be such that a certain distance is secured from the gas flow, a flat auxiliary electrode 400 is arranged parallel to the X-Z plane, and predetermined DC voltage (DC voltage having the same polarity as ions) is applied from a DC voltage source 401 to the auxiliary electrode 400.

A DC deflection electric field formed by the auxiliary electrode 400 exerts, on ions traveling in substantially the same direction (Z-axis direction) as the gas flow, a force that deflects the traveling direction of ions in a negative direction of the Y-axis (downward in FIG. 4). In this manner, it is possible to compensate for disturbance of an RF electric field and adjust the traveling direction of ions. Since the auxiliary electrode 400 is separated from the gas flow to some extent and extends substantially parallel to the traveling direction of the gas flow, it is possible to reduce contamination due to attachment of neutral particles to the auxiliary electrode 400. However, a shape and a position of the auxiliary electrode 400 are not limited to those in the example illustrated in FIG. 4, and can be appropriately changed.

Further, even in the mass spectrometer having the configuration illustrated in FIG. 1, that is, in the configuration in which the recessed portion 4*a* is not provided in the curved rod electrodes 41 to 48, as illustrated in FIG. 4, the auxiliary electrode 400 that forms a DC deflection electric field for deflecting ions may be provided to assist bending of ions.

Further, in the above embodiment, the RF ion guide 4 of a pole number conversion type and a curved shape is used in order to separate ions from gas flow and to guide ions to the ion passage hole 5*a*, but the RF ion guide 4 may not be of the pole number conversion type. That is, a curved RF ion guide having a quadrupole, hexapole, or octupole configuration may be used.

Further, as the RF ion guide 4, an ion guide having another structure may be used instead of a multipole ion guide. For example, an ion funnel can be used instead of a multipole ion guide. However, it is generally known that performance of an ion funnel is likely to deteriorate due to contamination. Further, since electrode plates need to be arranged at relatively narrow intervals along an ion optical axis, gas flow entering an internal space of the ion funnel is less likely to escape to the outside of the ion funnel. Thus, in a case of forming a curved ion path in which neutral particles carried in gas flow easily collide as in the present embodiment, it is considered to be more desirable to use a multipole ion guide than to use an ion funnel.

Figure 5:
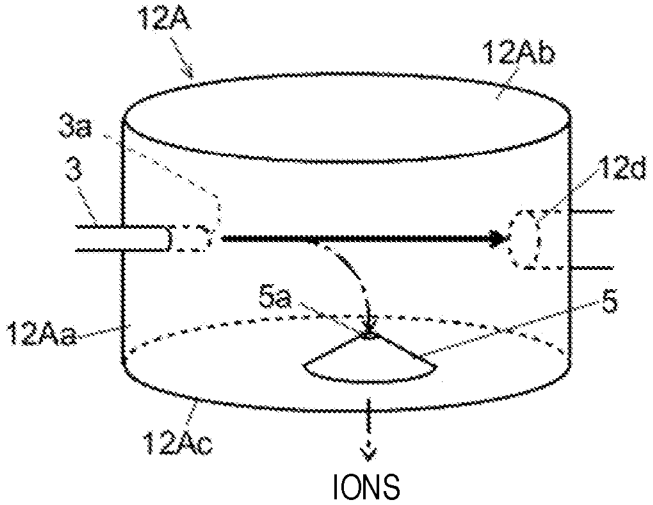
FIG. 5 is a schematic diagram of the first intermediate vacuum chamber in another variation of the mass spectrometer of the present embodiment.

Further, in the above embodiment, as illustrated in FIG. 1, the case where the first intermediate vacuum chamber 12 has a substantially rectangular parallelepiped shape and has six wall surfaces is assumed, but the shape of the first intermediate vacuum chamber 12 is not limited to the above. FIG. 5 is a schematic perspective view of the first intermediate vacuum chamber in another variation of the mass spectrometer of the present embodiment. In this diagram, description of the RF ion guide is omitted.

In this variation, a first intermediate vacuum chamber 12A has a substantially cylindrical shape in which both open ends are closed by a flat surface. That is, the first intermediate vacuum chamber 12A includes a first wall surface 12Aa having a cylindrical shape, and a second wall surface 12Ab and a third wall surface 12Ac having a planar shape. The ion outlet 3*a* at a terminal of the desolvation tube 3 is provided at a predetermined position of the first wall surface 12Aa, and the exhaust opening 12*d* is provided at a position on the first wall surface 12Aa substantially facing (in front of) the ion outlet 3*a*. The skimmer 5 is provided on the third wall surface 12Ac that is on the side when viewed from gas flow from the ion outlet 3*a* toward the exhaust opening 12*d*.

Also in this example, gas flow containing neutral particles discharged from the ion outlet 3*a* travels substantially straight and reaches the vicinity of the exhaust opening 12*d*, and is smoothly expelled to the outside of the chamber through the exhaust opening 12*d*. On the other hand, ions derived from a sample component introduced from the ion outlet 3*a* are separated from the gas flow by an action of an electric field formed by an RF ion guide (not illustrated), are separated from the gas flow, and have their track bent. Then, the ions pass through the ion passage hole 5*a* in a top portion of the skimmer 5 and are sent to a next stage. As described above, regardless of a shape and a structure of the first intermediate vacuum chamber, it is obvious that the above-described function and effect can be obtained by appropriately arranging the ion outlet 3*a*, the exhaust opening 12*d*, and the ion passage hole 5*a* and using the RF ion guide 4 that guides ions.

Further, in the above description, gas flow discharged from the ion outlet 3*a* is assumed to travel substantially straight, but the traveling direction of the gas flow may be slightly bent depending on a shape and a structure of the RF ion guide. Such a bend in the traveling direction can be experimentally analyzed. Therefore, a position of the exhaust opening 12*d* is in front of ion flow discharged from the ion outlet 3*a*, but is not necessarily located on a central axis of the ion flow, and can be appropriately shifted.

Further, in the embodiment and the variation described above, a track of ions emitted from the ion outlet 3*a* is bent by approximately 90°, but the angle may be any angle as long as ions can be separated from gas flow. Therefore, a position of the skimmer 5 having the ion passage hole 5*a* can also be provided on the second wall surface 12*b*, for example, instead of being provided on the third wall surface 12*c* different from both the first wall surface 12*a* and the second wall surface 12*b* as in the configuration of FIG. 1. That is, a position of the ion passage hole 5*a* only needs to be on a straight line intersecting (orthogonal or oblique to) a straight line connecting the ion outlet 3*a* and the exhaust opening 12*d*.

Further, although the above embodiment is a single type quadrupole mass spectrometer, it is obvious that the present invention can be applied to all mass spectrometers including an atmospheric pressure ion source, and for example, other types of mass spectrometers such as a triple quadrupole mass spectrometer and a quadrupole-time-of-flight mass spectrometer may be used.

Furthermore, the above-described embodiment and various variations are merely examples of the present invention, and it is a matter of course that modifications, corrections, additions, and the like appropriately made within the scope of the gist of the present invention are included in the claims of the present application.

[Various Modes]

It will be understood by those skilled in the art that the exemplary embodiment and variation described above are specific examples of modes described below.

(Clause 1) One mode of a mass spectrometer according to the present invention is a mass spectrometer having one or more intermediate vacuum chambers between an ion source configured to generate ions derived from a sample component in an atmospheric pressure atmosphere and a vacuum chamber in which a mass separator configured to mass-separate ions is arranged, the mass spectrometer including:

an ion transport unit configured to have an ion outlet in a first intermediate vacuum chamber at a subsequent stage of the ion source and send ions from the ion source to the first intermediate vacuum chamber;

an exhaust opening portion configured to evacuate the first intermediate vacuum chamber, the exhaust opening portion being provided at a position in front of ion flow discharged from the ion outlet into the first intermediate vacuum chamber;

an ion delivery opening portion configured to send ions from the first intermediate vacuum chamber to a next stage, the ion delivery opening portion being provided at a position on a line intersecting a straight line connecting the ion outlet and the exhaust opening portion; and an ion guide configured to guide ions emitted from the ion outlet to the ion delivery opening portion by an action of a radio-frequency (RF) electric field.

(Clause 2) In the mass spectrometer according to Clause 1, the first intermediate vacuum chamber may be surrounded by three or more substantially flat wall surfaces, the ion outlet may be provided on a first wall surface among a plurality of the wall surfaces, the exhaust opening portion may be provided on a second wall surface facing the first wall surface among a plurality of the wall surfaces, and the ion delivery opening portion may be provided on a third wall surface different from the first wall surface and the second wall surface among a plurality of the wall surfaces.

(Clause 3) Further, in the mass spectrometer according to Clause 2, the first wall surface and the second wall surface may be substantially parallel, and the third wall surface may be substantially orthogonal to the first wall surface.

In the mass spectrometer according to Clause 2 and Clause 3, the first intermediate vacuum chamber typically has a substantially rectangular parallelepiped shape.

According to the mass spectrometer according to Clauses 1 to 3, it is possible to efficiently transport ions introduced into the first intermediate vacuum chamber to a next stage, and, at the same time, to reduce intrusion of neutral particles such as sample component molecules introduced into the first intermediate vacuum chamber together with the ions into a vacuum chambers of a next and subsequent stages. Further, the neutral particles sent together with the ions from the ion source into the first intermediate vacuum chamber can be separated from the ions and quickly evacuated. In this manner, it is possible to reduce contamination due to attachment of neutral particles to inner walls of the first intermediate vacuum chamber and subsequent vacuum chambers, an ion optical element arranged in the vacuum chambers, and the like. As a result, it is possible to avoid a decrease in performance of the device such as a decrease in sensitivity, reduce the frequency of maintenance of the apparatus, and reduce running cost and downtime of the apparatus.

(Clause 4) In the mass spectrometer according to any one of Clauses 1 to 3, the ion guide may have a multipole structure in which a plurality of rod electrodes are arranged so as to surround an ion optical axis.

Since a multipole ion guide has a shape in which a rod electrode extends in a traveling direction of ions as a whole, gas flow discharged from the ion outlet is less likely to directly hit the rod electrode. Further, gas flow discharged from the ion outlet into a space surrounded by the rod electrodes easily exits to the outside of the space through a gap between the rod electrodes. For this reason, contamination of the rod electrode due to attachment of neutral particles contained in the gas flow is less likely to occur as compared with other RF ion guides such as an ion funnel. In this manner, according to the mass spectrometer described in Clause 4, contamination of the ion guide in the first intermediate vacuum chamber can be further reduced.

(Clause 5) In the mass spectrometer according to Clause 4, the ion guide may be a multipole type having a multipole structure of substantially a hexapole or more on the ion inlet side and a quadrupole structure on the ion outlet side.

According to the mass spectrometer according to Clause 5, it is possible to capture ions, which are emitted from the ion outlet and then travel while spreading, in an internal space surrounded by the rod electrode by a high confinement action. On the other hand, the ions transported while being confined in the internal space can be well converged in the vicinity of an ion optical axis and are allowed to pass through the ion delivery opening portion having a small diameter. In this manner, ions can be transported with low loss, and sensitivity of the apparatus can be improved.

(Clause 6) In the mass spectrometer according to Clause 4 or 5, a plurality of the rod electrodes constituting the ion guide may be configured not to be located on a plane including a central axis of the ion outlet and an ion optical axis of ions from the ion outlet to the ion delivery opening portion.

(Clause 7) In the mass spectrometer according to any one of Clauses 4 to 6, a plurality of the rod electrodes constituting the ion guide may have a shape in which a portion corresponding to a predetermined region around an extended line of a central axis of the ion outlet is missing.

According to the mass spectrometer according to Clauses 6 and 7, gas flow discharged from the ion outlet is less likely to directly hit the rod electrode constituting the ion guide, and contamination of the rod electrode can be further reduced. Further, since disturbance of gas flow by the rod electrode is less likely to occur, gas is smoothly expelled from the first intermediate vacuum chamber and less likely to spread into the first intermediate vacuum chamber. In this manner, contamination of an inner wall and the like of the first intermediate vacuum chamber can also be further reduced.

(Clause 8) The mass spectrometer according to Clause 1 or 5 may further include an auxiliary electrode configured to form a DC electric field outside the ion guide, the DC electric field assisting bending of a traveling direction of ions by the ion guide.

According to the mass spectrometer according to Clause 8, even in a case where an RF electric field of the ion guide is insufficient to bend ions, the ions can be satisfactorily deflected by an action of a DC electric field by the auxiliary electrode. In this manner, loss of ions during ion transport can be further suppressed, and sensitivity of the apparatus can be improved.

REFERENCE SIGNS LIST

1 . . . Chamber
11 . . . Ionization Chamber
12, 12A . . . First Intermediate Vacuum Chamber
12*a* . . . First Wall Surface
12*b* . . . Second Wall Surface
12*c* . . . Third Wall Surface
12*d* . . . Exhaust Opening
13 . . . Second Intermediate Vacuum Chamber
14 . . . Analysis Chamber
2 . . . ESI Probe
3 . . . Desolvation Tube
3*a* . . . Ion Outlet
4 . . . RF Ion Guide
41 to 48 . . . Curved Rod Electrode
4A . . . Ion Inlet
4B . . . Ion Outlet
4*a* . . . Recessed Portion
400 . . . Auxiliary Electrode
401 . . . DC Voltage Source
5 . . . Skimmer
5*a* . . . Ion Passage Hole
6 . . . RF Ion Guide
7 . . . Quadrupole Mass Filter
8 . . . Ion Detector
9 . . . Rotary Pump
10 . . . Pump
C . . . Ion Optical Axis

The invention claimed is:

1. A mass spectrometer having one or more intermediate vacuum chambers between an ion source configured to generate ions derived from a sample component in an atmospheric pressure atmosphere and a vacuum chamber in which a mass separator configured to mass-separate ions is arranged, the mass spectrometer comprising:

a first intermediate vacuum chamber which is surrounded by three or more substantially flat wall surfaces at a subsequent stage of the ion source;

an ion transport unit configured to have an ion outlet on a first wall surface among the three or more substantially flat wall surfaces and send ions from the ion source to the first intermediate vacuum chamber;

an exhaust opening portion configured to evacuate the first intermediate vacuum chamber, the exhaust opening portion being provided at a position on a second wall surface facing the first wall surface among the three or more substantially flat wall surfaces and substantially on an extended line of a central axis of the ion transport unit;

an ion delivery opening portion configured to send ions from the first intermediate vacuum chamber to a next stage, the ion delivery opening portion being provided at a position on a third wall surface different from the first wall surface and the second wall surface among the three or more substantially flat wall surfaces; and an ion guide configured to guide ions emitted from the ion outlet to the ion delivery opening portion by an action of a radio-frequency electric field, the ion guide having a multipole structure in which a plurality of rod electrodes curved in a substantially arc shape are arranged so as to surround an ion optical axis, the ion guide having a recessed portion at a position at which the extended line of the central axis of the ion transport unit intersects the ion guide.

2. The mass spectrometer according to claim 1, wherein the first wall surface and the second wall surface are substantially parallel, and the third wall surface is substantially orthogonal to the first wall surface.

3. The mass spectrometer according to claim 1, wherein the ion guide is a multipole type having a multipole structure of substantially a hexapole or more on an ion inlet side and substantially a quadrupole structure on an ion outlet side.

4. The mass spectrometer according to claim 1, wherein the plurality of rod electrodes constituting the ion guide are not located on a plane including a central axis of the ion outlet and an ion optical axis of ions from the ion outlet to the ion delivery opening portion.

5. The mass spectrometer according to claim 1, further comprising an auxiliary electrode configured to form a DC electric field outside the ion guide, the DC electric field assisting bending of a traveling direction of ions by the ion guide.

* * * * *